(12) United States Patent
Hosek et al.

(10) Patent No.: US 6,567,711 B1
(45) Date of Patent: May 20, 2003

(54) OBSERVER-CORRECTOR CONTROL SYSTEM FOR SYSTEMS WITH UNMODELED DYNAMICS

(75) Inventors: Martin Hosek, Lowell, MA (US); Jairo Terra Moura, Marlboro, MA (US); Hakan Elmali, Groton, MA (US)

(73) Assignee: Brooks Automation, Chelmsford, MA (US)

( * ) Notice: Subject to any disclaimer, the term of this patent is extended or adjusted under 35 U.S.C. 154(b) by 352 days.

(21) Appl. No.: 09/649,374

(22) Filed: Aug. 28, 2000

(51) Int. Cl.[7] .............................................. G05B 13/02
(52) U.S. Cl. ........................... 700/55; 700/30; 700/34; 700/39; 700/45; 700/46; 701/37; 701/70; 701/72; 701/110; 381/61; 381/98; 381/106; 381/119; 180/197
(58) Field of Search .............................. 700/55, 30, 33, 700/34, 38, 37, 39, 45–46; 180/197; 701/4, 37, 70, 72, 110, 125, 29; 381/98, 61, 106, 119

(56) References Cited

U.S. PATENT DOCUMENTS

| | | | |
|---|---|---|---|
| 5,038,096 A | * 8/1991 | Obie et al. | 324/76.23 |
| 5,473,698 A | 12/1995 | Garnjost et al. | 381/71 |
| 5,934,424 A | 8/1999 | Hosek et al. | 188/379 |
| 5,994,867 A | * 11/1999 | Birk et al. | 318/609 |
| 6,016,395 A | * 1/2000 | Mohamed | 717/149 |
| 6,085,127 A | * 7/2000 | Vos | 701/4 |
| 6,141,378 A | 10/2000 | d'Oreye de Lantremange | |
| 6,177,893 B1 | 1/2001 | Velazquez et al. | 341/118 |
| 6,188,692 B1 | 2/2001 | Huscroft et al. | 370/395 |
| 6,216,058 B1 | * 4/2001 | Hosek et al. | 700/245 |
| 6,261,236 B1 | * 7/2001 | Grimblatov | 415/189 |

* cited by examiner

Primary Examiner—Ramesh Patel
(74) Attorney, Agent, or Firm—Perman & Green, LLP (57) ABSTRACT

A system for extracting a signal component from an output signal of a dynamic system. The system comprises a state observer and a corrector filter. The state observer is adapted to track a signal component that represents dominant dynamics in the output signal of the dynamic system and provide an estimation signal representing an estimated signal component in the output signal of the dynamic system. The corrector filter is adapted to compensate for a mismatch between the estimation signal and the actual signal component that represents the dominant dynamics in the output signal. A combination of the estimation signal with an output signal of the corrector filter can provide a synthesized signal including the signal component that represents the dominant dynamics in the output signal.

20 Claims, 8 Drawing Sheets

OBSERVER-CORRECTOR CONTROL SYSTEM FOR SYSTEMS WITH UNMODELED DYNAMICS

BACKGROUND OF THE INVENTION

1. Field of the Invention

The present invention relates generally to control systems and, more particularly, to a system and method for reducing effects of unmodeled dynamics in real-world systems subject to control.

2. Prior Art

Real-world dynamic systems often exhibit resonance properties, which are associated with high-order dynamics that are unnecessary and undesirable for proper operation. The high-order effects are imposed on the dominant dynamics of the system which is, in contrast, essential to achieve required functionality. Typical examples are mechanical systems, such as rotating machinery, machine tools, robotic manipulators and space structures, which frequently exhibit numerous resonance conditions associated with inevitable elasticity of mechanical components. In many practical situations, the higher-order dynamics are difficult to identify and remain excluded from the theoretical model of the system.

When feedback control is applied to enhance operation of a dynamic system, the presence of the higher-order dynamics results in undesirable oscillations, affects overall stability, and leads to limited control performance. Considering the level of contribution of high-order dynamics to the output of a dynamic system, the following two categories of control applications can be identified:

In the first category, the effects of the high-order dynamics under given operating conditions exceed acceptable errors in the output of the system. Typical examples are found in light robotic manipulators and space structures where excessive deflections of structural members and links directly affect positioning accuracy. The deflections may result from external excitation or internal actuation, such as execution of commanded trajectory profiles in the case of robotic manipulators. Since the presence of the high-order dynamics leads to unacceptable errors in the output, the control system needs to be selected and designed to take account and to suppress the higher-order dynamic effects. Prior art strategies in this area include the following categories of control methods: feedback of state variables which represent the high-order dynamics of the system subject to control; input shaping methods suitable for open-loop and closed-loop implementation; boundary control techniques for mechanical systems; and passive, semi-active and active vibration damping strategies for mechanical systems.

The second category comprises dynamic systems where the effects of the high-order dynamics on the output subject to control remain within acceptable limits and, therefore, can be tolerated without sacrificing desired accuracy. In this case, however, the high-order dynamics may degrade overall stability and become a limiting factor for the control performance. These difficulties frequently arise when the bandwidth required for proper operation approaches the lowest resonance frequency of the controlled system and/or there is not enough inherent damping to prevent instability. The bandwidth of a system is defined to be the maximum frequency at which the output of a system will track an input sinusoid in a satisfactory manner. By convention, for linear systems with non-zero DC gain, the bandwidth is the frequency of the input at which the output is attenuated to a factor of 0.707 times the input (or down 3 dB) relative to the DC gain. Typical example applications in this category include industrial robots and precision machine tools. Despite the rugged design that prevents structural deflections beyond required accuracy, the high-performance servo controllers for these applications have to cope with numerous lightly-damped resonance conditions. In general, the control methods listed above for the first category can be considered as potential solutions. However, their practical use is limited due to one or more of the following requirements and complications: a complete and accurate model of the controlled system is necessary, additional sensing and/or actuation arrangements are required, computational and/or hardware complexity increases undesirably, or the level of sensitivity to variations in the system parameters is not acceptable. Since the presence of the higher-order dynamics does not affect accuracy of the output beyond acceptable limits, direct suppression of the higher-order dynamic effects on the output of the system is not critical. Consequently, simpler methods, such as implementation of low-pass filters and band-reject filters, are preferably adopted in practice to improve stability and to enhance control performance. However, the effectiveness of these approaches is limited since low-pass filters generally introduce amplitude distortion and destabilizing phase lag, and band-reject filters are not suitable for applications where the resonance conditions shift during operation, change due to regular wear and tear, or vary because of production inconsistency.

SUMMARY OF THE INVENTION

In a first aspect, the present invention is directed to a system for extracting a signal component that represents dominant dynamics of a dynamic system from an output signal of a dynamic system. In one embodiment, the system comprises a state observer and a corrector filter. The state observer is adapted to track a signal component that represents the dominant dynamics in the output signal of the dynamic system, and provide an estimation signal representing an estimated signal component that represents the dominant dynamics in the output signal of the dynamic system. The corrector filter is adapted to compensate for a mismatch between the estimation signal and the actual signal component that represents the dominant dynamics in the output signal. A combination of the estimation signal with an output signal of the corrector filter can provide a synthesized signal including the signal component that represents the dominant dynamics in the output signal of the dynamic system.

In another aspect, the present invention is directed to a method of extracting a signal component that represents dominant dynamics of a dynamic system from an output signal of a dynamic system. In one embodiment, the method comprises estimating a signal component that represents the dominant dynamics in the dynamic system output signal and compensating for a mismatch between the estimated signal component and an actual signal component that represents the dominant dynamics in the dynamic system output signal. The estimated signal component can be combined with a signal representing the compensation for a mismatch between the estimated signal component and the actual signal component to provide a synthesized signal including the signal component that represents the dominant dynamics in the output signal.

In a further aspect, the present invention is directed to a method of reducing destabilizing effects of high-order dynamics in a controlled system. In one embodiment, the method comprises tracking a signal component that represents dominant dynamics in an output signal of the controlled system and providing an estimation signal representing an estimated component that represents the dominant dynamics in the output signal of the controlled system. A mismatch between the estimation signal and the actual signal component that represents the dominant dynamics is compensated for by combining the estimation signal and an output signal from a corrector filter to form a synthesized feedback signal. The synthesized feedback signal includes a signal component that represents the dominant dynamics in the output signal of the controlled system and is inputted to a controller for the controlled system, wherein a destabilizing effect of unmodeled higher order dynamic signal components in the dynamic system output signal is reduced or substantially eliminated.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
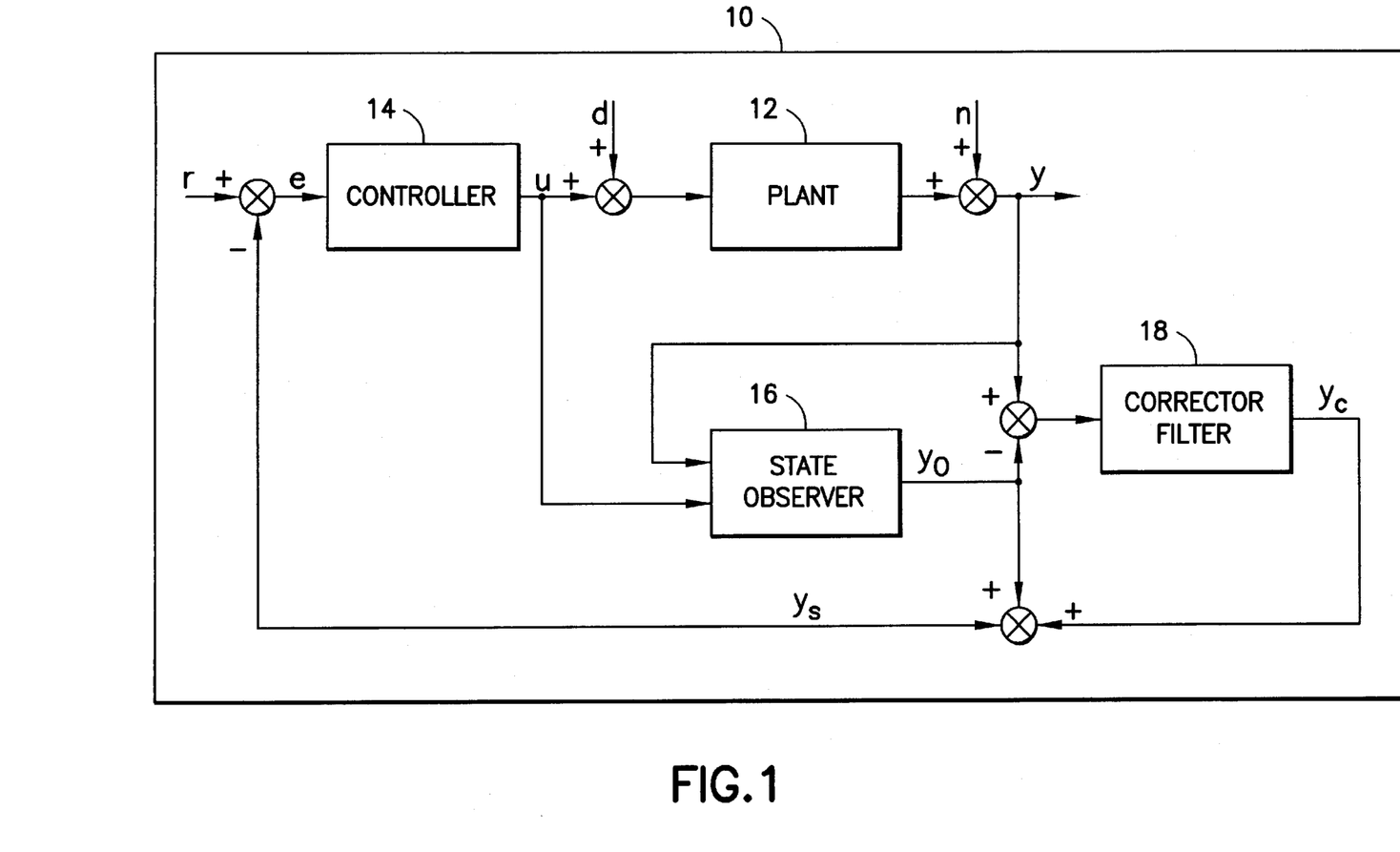
FIG. 1 is a schematic diagram of a system incorporating features of the present invention.

Referring to FIG. 1, a schematic diagram of a system 10 incorporating features of the present invention is shown. Although the present invention will be described with reference to the embodiments shown in the drawings, it should be understood that the present invention can be embodied in many alternate forms of embodiments. In addition, any suitable size, shape or type of elements or materials could be used.

As shown in FIG. 1, the system 10 generally comprises a state observer 16 and a corrector filter 18. The general arrangement of the components of the system 10 as shown in FIG. 1, can be used to extract the signal components that represent dominant dynamics of a dynamic or controlled system 12, also referred to herein as a plant 12, from an output signal of the system 12. As used herein, the term "dominant dynamics" is used to refer to those dynamic properties of a dynamic system that are essential to achieve required functionality and proper operation of the system, such as for example, the rigid body motion in the case of a flexible robotic manipulator. In an alternate embodiment, the system 10 can include such other suitable components for extracting the signal component that represents the dominant dynamics in an output signal of a dynamic system 12. As shown in FIG. 1, one embodiment of the present invention may also include a controller 14. It is a feature of the present invention to provide a synthesized feedback signal $y_s$ as an input to the controller 14 that includes the signal components that represent the dominant dynamics extracted from the output signal of the plant 12, and does not include any higher order dynamic components of the plant 12 output signal y. Since the higher order dynamics are not reflected in the feedback signal $y_s$, the arrangement of the state observer 16 and corrector filter 18 reduces or substantially eliminates the effects of unmodeled dynamics found in a dynamic system, such as a real world system subject to control. As used herein the term "unmodeled dynamics" refers to the "higher order dynamics" The term "higher order dynamics" refers to the dynamic properties unnecessary and undesirable for proper operation, which typically can include the resonance properties associated with real world dynamic systems such as the plant 12. Typical examples of such real world dynamic systems can include, for example, rotating machinery, machine tools, robotic manipulators, space structures, and such other systems that exhibit resonance conditions associated with the elasticity of mechanical components. In many situations, the higher order dynamics are difficult to identify and remain excluded from a theoretical model of the plant 12.

As shown in FIG. 1, the term "r" denotes the reference signal, "e" is the control error, "u" refers to the control action, "d" is external disturbance, "n" stands for measurement noise, "y" stands for the output of the plant 12, "$y_o$" represents the output of the state observer 16, "$y_c$" is the output of the corrector filter 18, and "$y_s$" is the synthetic feedback signal. The symbols denoted above may represent either scalar variables or vectors, depending on the number of inputs and outputs of the plant 12.

Generally, it is assumed that the undesirable resonance conditions of the plant 12 (i.e., the higher-order dynamic effects) appear at frequencies above the bandwidth essential for required operation (i.e., the dominant dynamics). As used herein, the bandwidth of a system is defined to be the maximum frequency at which the output of a system will track an input sinusoid in a satisfactory manner. By convention, for linear systems with non-zero DC gain, the bandwidth is the frequency of the input at which the output is attenuated to a factor of 0.707× the input (or down 3 dB) relative to the DC gain. Since the undesirable resonance conditions (the higher-order dynamics) of the plant 12 appear at the frequencies above the bandwidth essential for required operation (the dominant dynamics) of the plant 12, the dominant dynamics and the undesirable higher order dynamic effects can be separated in the frequency domain.

Generally, the external disturbance "d" is expected to be relatively slow, i.e., of low-frequency contents, in comparison with the higher order dynamics of the plant 12. The measurement noise "n" is assumed to be of a higher frequency nature compared to the bandwidth of the dominant dynamics. These assumptions are generally realistic for typical control applications. They reflect the requirement that the bandwidth of the dominant dynamics of the plant 12, and the disturbance "d" to be compensated for, cannot overlap with the frequency contents of the measurement noise "n" in order for the control to be effective.

In accordance with the assumptions formulated for the plant dynamics, external disturbance "d" and measurement noise "n", the output "y" of the plant 12 can be decomposed as follows:

$$y(t)=y_d(t)+y_h(t) \tag{Eq.1}$$

where $y_d$ refers to the component of the plant output y which corresponds to the dominant dynamics, and $y_h$ represents the components of the plant output y which correspond to the higher order dynamics and noise.

As shown in FIG. 1, the state observer 16 is generally employed for the on-line estimation of the state and output variables associated with the dominant dynamics of the plant 12. Generally, the state observer is adapted to track a signal component that represents the dominant dynamics in the output signal of the dynamic system, herein referred to as the actual signal component that represents the dominant dynamics in the output signal of the dynamic system. Generally, this signal component cannot be directly measured and needs to be estimated by means of the state observer utilizing available measurements of the output signal. The state estimation is based on an approximate theoretical model of the dominant dynamics of the plant 12. Generally, the state observer 16 is designed with a limited bandwidth selected so that it satisfactorily tracks the dominant dynamics of the plant 12, but does not respond to the higher frequency inputs which are associated with the higher order dynamics and measurement noise "n". In an alternative embodiment, the state observer can be designed with any suitable bandwidth. The accuracy of the estimated output of the plant 12 is generally limited due to observation errors which typically result from modeling imperfections and, as such, are of a low frequency nature. The output $y_o$ of the state observer 16 can then be expressed in the following form:

$$y_o(t)=y_d(t)+y_e(t) \quad (Eq. 2)$$

where $y_e$ represents the state observer estimation error.

In order to compensate for the mismatch between the output of the state observer 16 and the actual dominant dynamics of the plant 12, a corrector filter 18 can be incorporated into the system 10 as shown in FIG. 1. Generally, the corrector filter 18 can be a linear low-pass filter adapted to let through the lower frequency components corresponding to the dominant dynamics and observation errors, and to attenuate the higher frequency components of the undesirable dynamics and measurement noise. In an alternative embodiment, the corrector filter 18 can comprise any suitable signal filtering device, other than including a low pass filter. As shown in FIG. 1, the input of the corrector filter 18 is calculated as a difference between the output y of the plant 12 and the estimate $y_o$ obtained from the state observer 16. Thus, the input signal to the corrector filter 18 can be written as:

$$y(t)-y_o(t)=y_d(t)+y_h(t)-y_d(t)-y_e(t)=y_h(t)-y_e(t) \quad (Eq. 3)$$

Since the corrector filter 18 is linear, the feedback portion of FIG. 1, i.e., the path from the plant 12 and state observer 16 to the controller 14, can be analyzed in terms of a Laplace transform, despite the fact that the plant 12, state observer 16 and controller 14 may posses nonlinear properties. Using this approach, the output $y_c$ of the corrector filter 18 can be represented as:

$$y_c(s)=G_c(s)[y_h(s)-y_e(s)]=G_c(s)y_h(s)-G_c(s)y_e(s) \quad (Eq.4)$$

The symbols $y_c$ (s), $y_h$ (s) and $y_e$ (s) are written for the Laplace transforms of $y_c$ (t), $y_h$ (t) and $y_e$ (t), respectively. $G_c$ (s) refers to the transfer function of the corrector filter 18. Since the filter 18 is designed to attenuate the undesirable frequency components corresponding to the higher-order dynamics and noise, $y_h$ is virtually eliminated from the signal, i.e., $G_c$ (s) $y_h$ (s)≈0. In contrast, the state observer estimation error $y_e$, being of low-frequency nature, passes through. Ideally, $G_c$ (s) $y_e$ (s)≈$y_e$ (s). Applying these observations to Eq.(4), the output of the corrector filter 18 simplifies approximately to the negative of the state observer estimation error:

$$y_c(s)≈-y_e(s) \text{ or } y_c(t)≈-y_e(t) \quad (Eq.5)$$

Finally, the estimated output of the plant 12 obtained from the state observer 16 and the output of the corrector filter 18 are combined to synthesize the substitute feedback signal:

$$y_s(t)=y_o(t)+y_c(t) \quad (Eq. 6)$$

The contents of the feedback signal $y_s$ can be assessed by substituting equations (2) and (5) into equation (6) to result in:

$$y_s(t)=y_d(t)+y_e(t)+y_c(t)≈y_d(t)+y_e(t)-y_e(t)=y_d(t) \quad (Eq.7)$$

Eq. (7) indicates that the effect of the observer-corrector arrangement is to extract the component that represents the dominant dynamics of the plant 12 from the output of the plant 12.

Generally, the controller 14 comprises a conventional controller designed for a virtual system with no higher order dynamics. In an alternate embodiment, the controller 14 can include any suitable control device for controlling a dynamic system. As shown in FIG. 1, the controller 14 can be adapted to receive the feedback signal $y_s$ as an input and apply a control signal to the plant 12. Generally, the controller 14 is designed and operating based on an incomplete model of the plant 12. As used herein the term "incomplete model" refers to a model of the plant 12 which reflects the dominant dynamics of the plant 12 and ignores or disregards all higher order dynamic effects. For example, for a robot with flexible links, the model would treat the links as rigid bodies (dominant dynamics) and neglect deflections of the links due to their flexibility (high-order dynamics). It is a feature of the present invention to introduce a substitute feedback signal $y_s$ which is synthesized to reflect the dominant dynamic components in the output y of the controlled system or plant 12. The arrangement of the state observer 16 and corrector filter 18 as shown in FIG. 1 can be employed for this purpose. In an alternate embodiment, the state observer 16 and corrector filter 18 can be arranged in any manner suitable for extracting the dominant dynamic components of a signal. For the embodiment shown in FIG. 1, the feedback signal $y_s$ is used as an input to the controller 14, effectively reducing or substantially eliminating the destabilizing effects of unmodeled dynamics of the plant 12.

Generally, the state observer 16 and corrector filter 18 operate in a complementary manner. Their individual contributions can be illustrated by considering the following situations:

Perfect Observer Output. If the estimated output obtained from the state observer 16 matches exactly the dominant dynamics of the plant 12, $y_o=y_d$, the input of the corrector filter 18 in Eq. (3) reduces to the high-frequency components $y_h$. These are attenuated in the filter 18 due to its low-pass characteristics, resulting in $y_c≈0$. According to Eq. (6), the synthetic feedback signal then becomes identical to the output of the state observer 16; $y_s=y_o$. That is, if the estimated output obtained from the state observer 16 is perfect, i.e., there are no observation errors, the observer-corrector arrangement behaves as a state observer 16 alone. However, observation errors are inevitable due to inherent modeling imperfections.

Zero Observer Output. In contrast, if the state observer 16 does not operate, $y_o=0$, the entire output of the plant 12 is directed through the corrector filter 18. According to Eq.

(6), the corrector filter 18 becomes the only contributor to the feedback signal, $y_s = y_c$. In this case, the observer corrector arrangement acts as a simple low-pass filter, including the negative effects of amplitude distortion and destabilizing phase lag.

Normal Operation. Generally, under normal operating conditions, the state observer 16 and corrector filter 18 complement each other. Due to the presence of the state observer 16, a minimum portion of the feedback signal is subject to undesirable distortion due to low-pass filtering. The corrector filter 18, on the other hand, compensates for inevitable errors associated with observation of the dominant dynamics of the plant 12.

Generally, the resulting synthetic feedback signal $y_s$ can be viewed as an output of a virtual plant which assumes the dominant dynamics of the actual system, but does not exhibit the undesirable higher-order dynamic effects. For example, considering a robotic manipulator with flexible links, the synthetic feedback signal can be associated with a virtual rigid manipulator with the same joint angles and undeformed links. As a result, the controller 14 can be designed practically without taking the higher-order dynamic effects into account, which allows for use of conventional control techniques, and translates into reduced modeling requirements, simplified controller design and shorter development time when compared to a complete dynamic analysis. In comparison with conventional low-pass filtering, improved stability margin and better control performance can be achieved due to reduced amplitude and phase distortion of the feedback signal.

Figure 2:
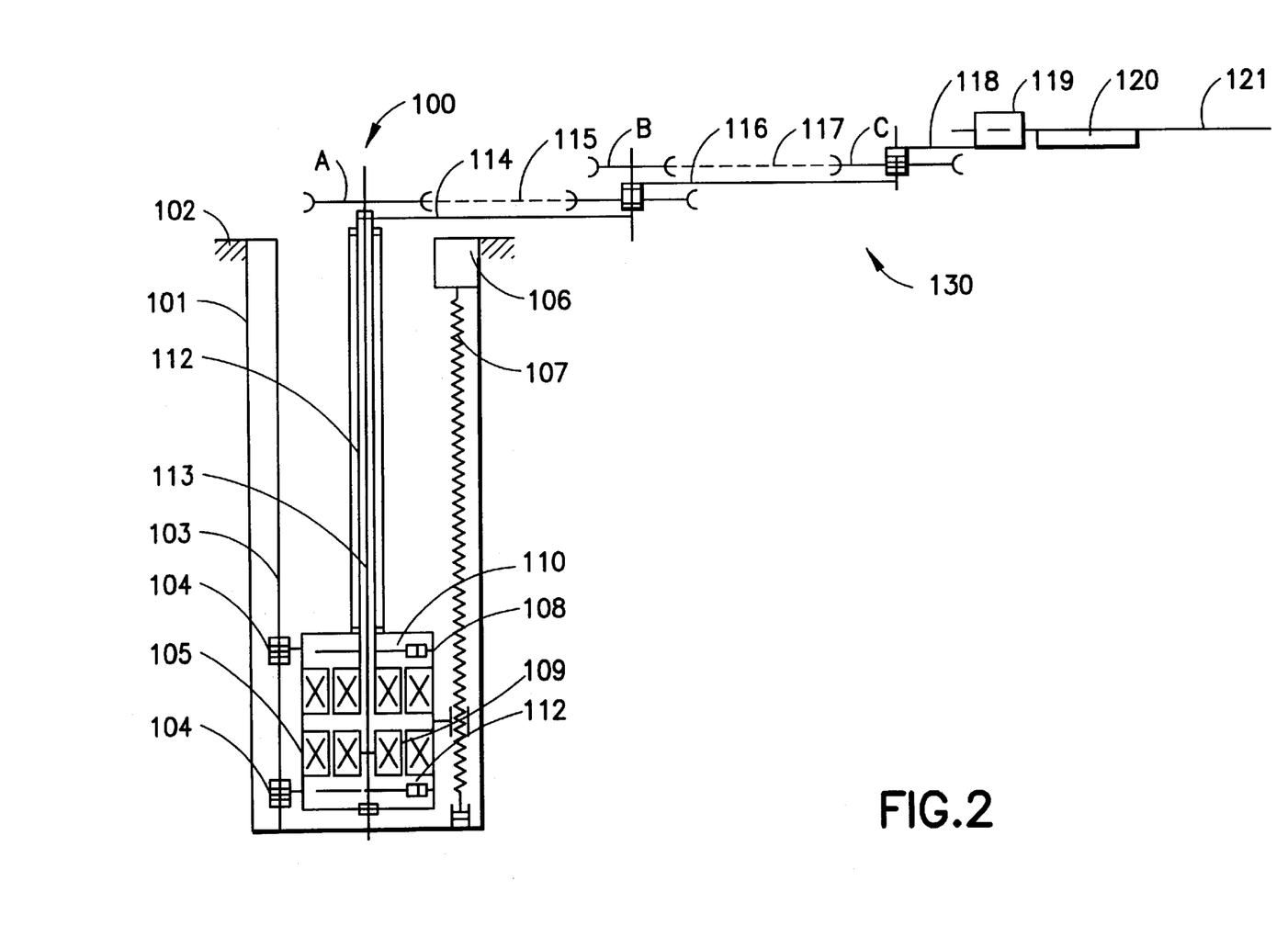
FIG. 2 is a schematic diagram of an exemplary test robotic manipulator.
Figure 3:
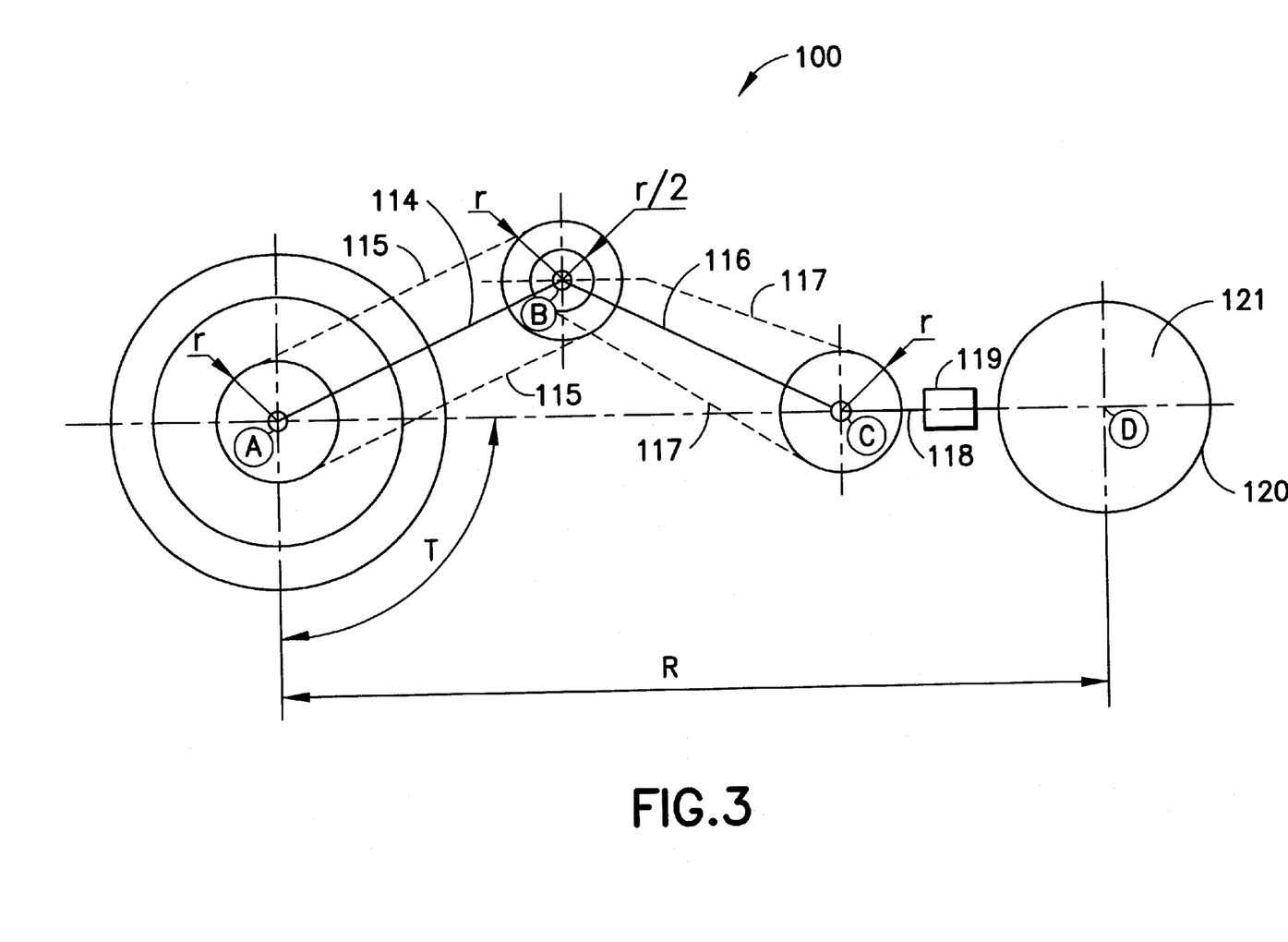
FIG. 3 is a top view of the test robotic manipulator of FIG. 2.

For example, in the exemplary embodiment shown in FIG. 2, the plant 12 can comprise a light four-axis robotic manipulator 100 for automated pick/place operations in semiconductor manufacturing applications. The robotic manipulator 100 is built around an open cylindrical frame 101 suspended from a circular mounting flange 102. The frame 101 incorporates two vertical rails 103 with linear bearings 104 to provide guidance to a carriage 105 driven by a brushless DC motor 106 via a ball-screw mechanism 107. Only one of the rails 103 is shown for simplicity. The carriage 105 houses a pair of coaxial brushless DC motors 108 and 109 equipped with optical encoders 110 and 111. The upper motor 108 drives a hollow outer shaft 112 connected to the first link 114 of the robot arm. The lower motor 109 is connected to a coaxial inner shaft 113 which is coupled via a cable drive 115 to the second link 116. Another cable arrangement 117 is employed to maintain radial orientation of the third link 118 regardless of the position of the first two links 114 and 116. This is achieved due to a 1:2 ratio between the pulley B incorporated into the first link 114 and the pulley C connected to the third link 118. The third link 118 carries a brushless DC motor 119 that is used to rotate the end-effector 120. A payload 121, such as a semiconductor substrate is held attached to the end-effector 120 by the means of a vacuum grip. However, features of the present invention could be used with any suitable robotic arm on a robot. Considering the location of the arm 130 comprising links 114, 116 and 118 in a given horizontal plane, the position of the end-effector 120 is defined in a polar coordinate system using a radial extension R and angular orientation T, as illustrated in FIG. 3.

The frame 101 is preferably designed with a relatively small diameter and large height in order to comply with strict space limitations and to accommodate required vertical stroke. This design constraint results in compromised stiffness of the components involved, specifically the robot frame 101, linear bearings 104 and driving shafts 112, 113.

Similarly, the links 114, 116 and 118 are slim and light to achieve a low-profile contour, high-speed performance and low power requirements. The link shells, joint bearings and cable drives 115, 117 thus represent additional sources of structural elasticity. As a result, the rigid body dynamics of the robotic manipulator 100 shown in FIG. 2 is accompanied by a number of position-dependent lightly-damped vibration modes (resonance conditions) which interfere with traditional control techniques developed for rigid manipulators.

In one embodiment, the basic dimensions and the lowest natural frequency interfering with the control of the exemplary robotic manipulator 100 shown in FIG. 2 can be summarized as follows:

| | |
|---|---|
| Length of first link (A to B) 114 | 0.243840 m |
| Length of second link (B to C) 116 | 0.243840 m |
| Length of third link (C to D) 118 | 0.362712 m |
| Vertical stroke of ball-screw mechanism 107 | 0.438 m |
| Lowest natural frequency interfering with controller 14 | 22 Hz |

Figure 4:
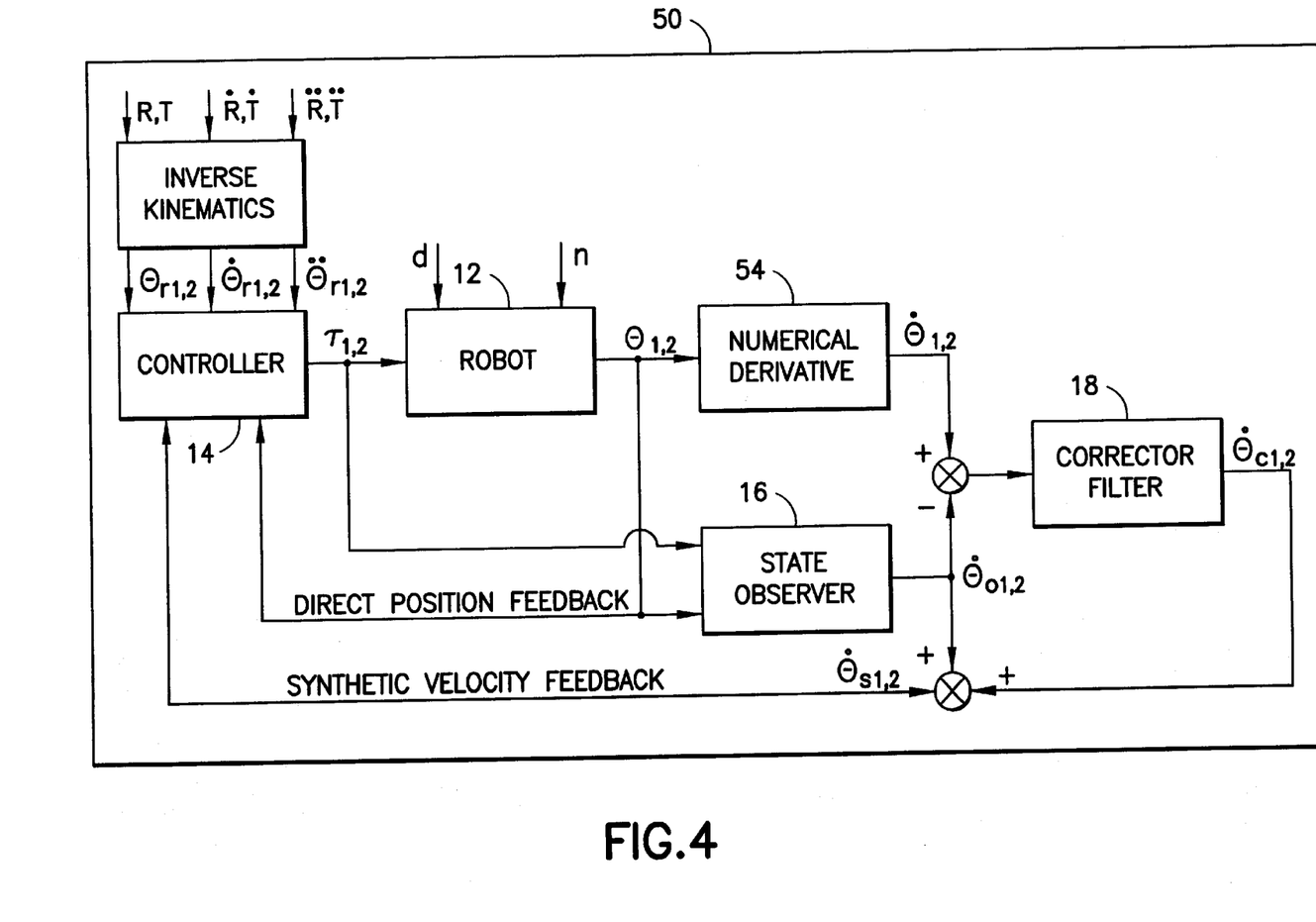
FIG. 4 is a block diagram of an exemplary test implementation of an observer-corrector control system incorporating features of the present invention.

The presence of the flexible vibration modes affects particularly the motion control of the directly driven robot arm 130 by motors 108 and 109 in FIG. 2, where accurate trajectory tracking and minimum settling times are needed. An observer-corrector system incorporating features of the present invention can be employed for this control task. A simplified block diagram of an exemplary implementation of an observer-corrector system incorporating features of the present invention that can be applied to robotic manipulator 100, is shown in FIG. 4. The following nomenclature is adopted: R and T represent the commanded trajectory in terms of the polar coordinates of the end-effector; $\theta_{r1}$ and $\theta_{r2}$ denote the commanded trajectory converted to angular positions of the motor 108 and 109, $\tau_1$ and $\tau_2$ are torques exerted by the motors 108 and 109; $\theta_1$ and $\theta_2$ stand for angular positions obtained from the encoders 110 and 111 and symbols "." and ". ." indicate the first and second time derivatives, respectively. Subscripts "c", "o", and "s" are used to correspond with the nomenclature used in with FIG. 1.

For the example shown in FIG. 4, the controller 14 alone operates on position and velocity feedback using a standard implementation of the computed torque technique. It comprises a rigid-body model of the robotic manipulator 100 complemented by a PD compensator with a disturbance observer for each of the motors 108, 109. While the position measurements $\theta_{1,2}$ are fed back directly to the controller 14 from the encoders 110, 111, synthetic velocity signals $\dot{\theta}_{s1,2}$ obtained from the observer-corrector arrangement shown in FIG. 4 are fed back to the controller 14. This hybrid implementation is selected since it is primarily the derivative section of the controller 14 which amplifies the higher frequency components of the velocity signals corresponding to the undesirable vibration modes and measurement noise. The raw velocity signals $\dot{\theta}_{1,2}$ are obtained by numerical differentiation of the encoder readings in the numerical derivative section 54. The state observer 16 is designed to track the rigid body dynamics of the manipulator 100 within a specified bandwidth. In the exemplary embodiment shown in FIG. 4, the corrector filter 18 comprises a pair of second-order low-pass filters, one for each motor 108, 109. The entire control is preferably implemented in a digital form, and executed at the sampling rate of 1 kHz.

Typical operations performed by the robot 100 shown in FIG. 2 include radial moves (when the end-effector 120 tracks a straight line at a constant angular orientation T) and rotational moves (when the end-effector 120 follows a circular arc at a constant radial extension R). If needed, these elementary moves can be combined and blended into more complex and smooth trajectories.

Figure 5A:
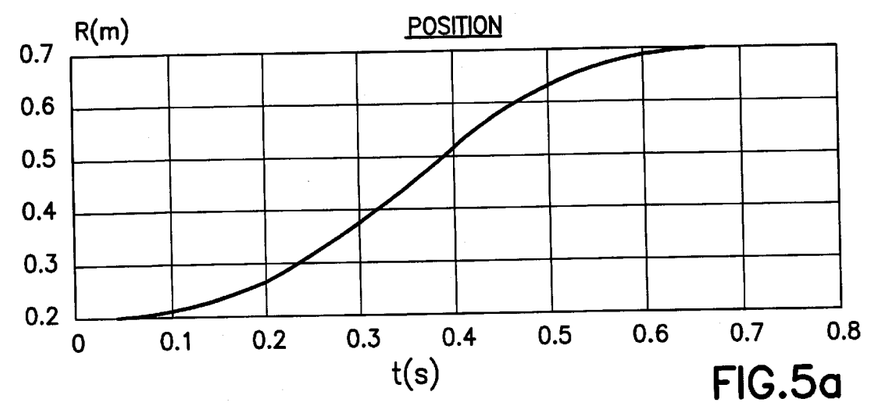
FIGS. 5a, 5b and 5c are graphical representations of the corresponding commanded position, velocity and acceleration profiles for the test move of the exemplary robotic manipulator shown in FIGS. 2 and 3.
Figure 5B:
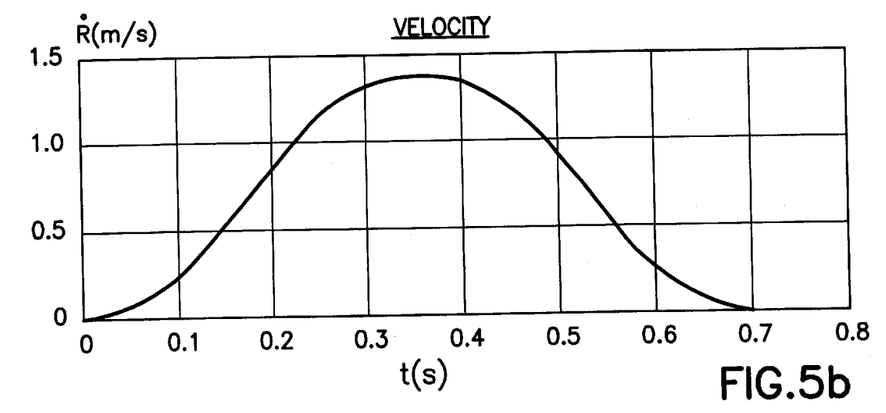
Figure 5C:
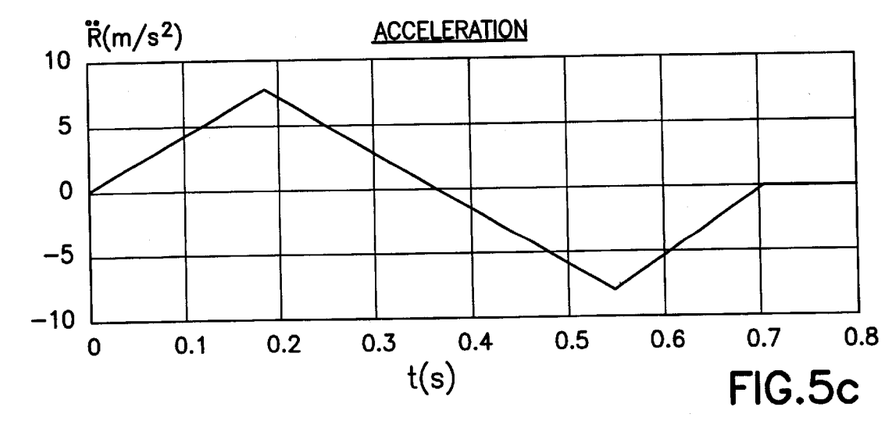

Using the exemplary control system shown in FIG. 4, the performance of the control system of the present invention for the exemplary test robotic manipulator shown in FIG. 2, is tested for a simple straight-line move from initial radial position of 0.2 meters to a final extension of 0.7 meters. The motion is constrained by maximum jerk of 45 m/s³. The corresponding commanded position, velocity and acceleration profiles are shown in FIG. 5. The control parameter settings of the PD compensators, state observer 16 and corrector filters 18 for the test embodiment of FIG. 4 are as follows:

| Parameter | PD compensators | Low-pass filters | State observer |
|---|---|---|---|
| Bandwidth/cut-off frequency | 5 Hz | 12 Hz | 12 Hz |
| Damping ratio | 1 | 1/sqrt(2) | 1 |

In this embodiment, the state observer 16 and corrector filters 18 provide attenuation of approximately 70% at the frequency of 22 Hz, which is identified as the lowest resonance frequency interfering with the control.

Figure 6A:
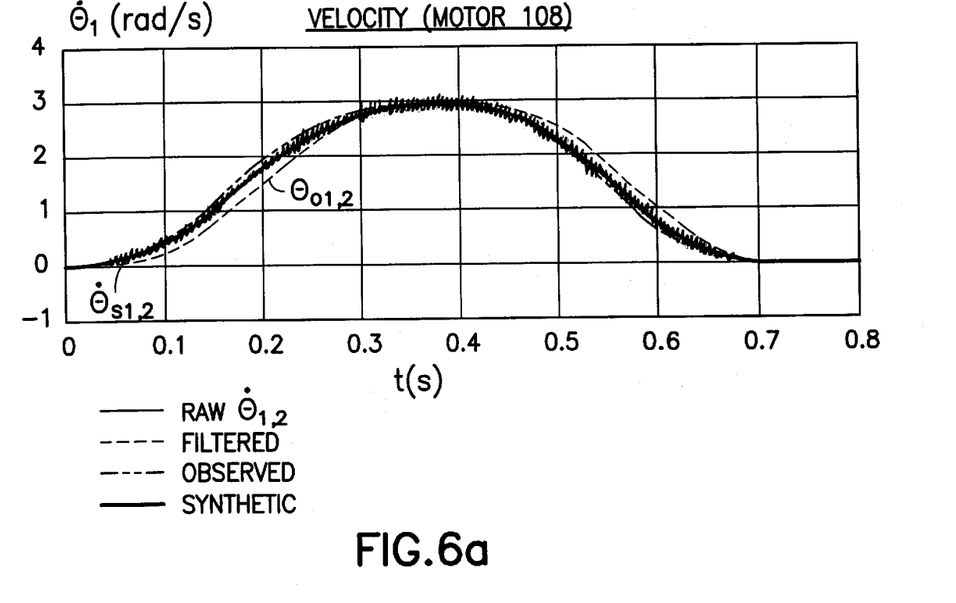
FIGS. 6a, and 6b are graphical representations of the velocity profiles for the test moves of the motors for the exemplary embodiment shown in FIG. 4.
Figure 6B:
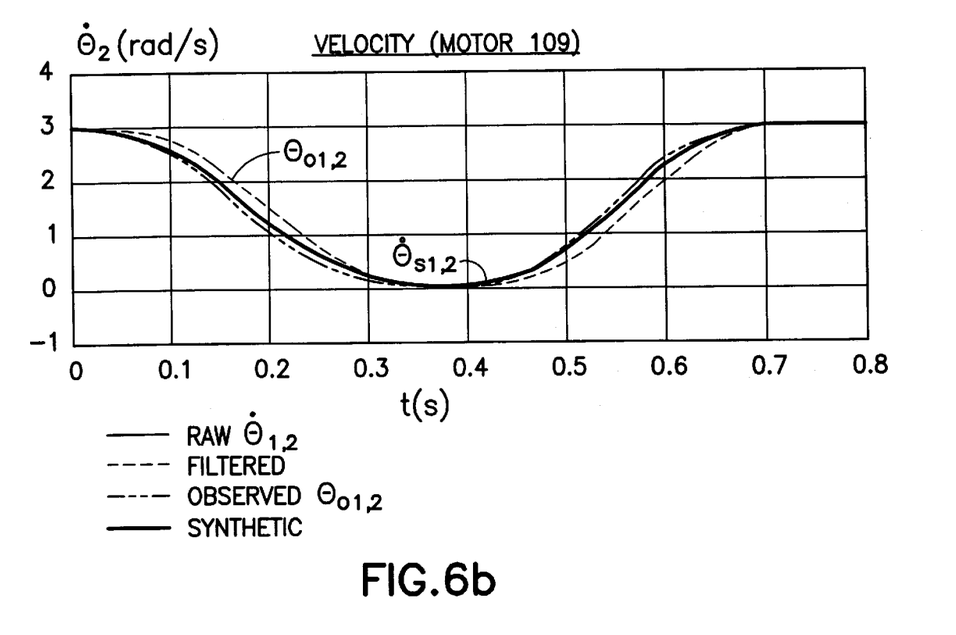

The effects of the observer-corrector arrangement in the velocity loop of FIG. 4 are shown in FIG. 6. The raw velocity signals are visibly contaminated by undesirable high-frequency components (hairline). Conventionally, the velocity signals would be passed through the corrector filters 18, which would act as ordinary low-pass filters in this mode of operation, resulting in significant phase-lag distortion (dashed line), and fed back to the controller 14. In the observer-corrector system of FIG. 4, in contrast, the feedback signals originate in the state observer 16 (dotted line), and the corrector filters 18 are employed to correct inevitable observation errors resulting from modeling imperfections. In this embodiment, the observation errors can be attributed primarily to inaccuracy of the model parameters and to unmodeled effects of viscous damping and dry friction. Combining the observed velocities $\dot{\theta}_{o1,2}$ with the outputs $\dot{\theta}_{c1,2}$ of the corrective filters 18 yields clean synthetic feedback signals $\dot{\theta}_{s1,2}$ which closely follow the raw velocities $\dot{\theta}_{1,2}$ but do not contain undesirable high-frequency components (bold line). The feedback signals $\dot{\theta}_{s1,2}$ show substantially smaller errors than the filtered and observed velocities alone.

In order to quantify the improvement achieved due to the observer-corrector mechanism of the present invention, the control performance of the exemplary embodiment shown in FIG. 4 is compared with an equivalent conventional control approach in terms of motor tracking errors. The state observer 16 is disconnected in this case. The raw velocity signals $\dot{\theta}_{1,2}$ are passed through the filters 18, which act as ordinary low-pass filters in this mode of operation, and are fed back to the controller 14. The control parameters for this embodiment are shown as follows:

| Parameter | PD compensators | Low-pass filters | State observer |
|---|---|---|---|
| Bandwidth/cut-off frequency | 2 Hz | 12 Hz | N/A |
| Damping ratio | 1 | 1/sqrt(2) | N/A |

Figure 7A:
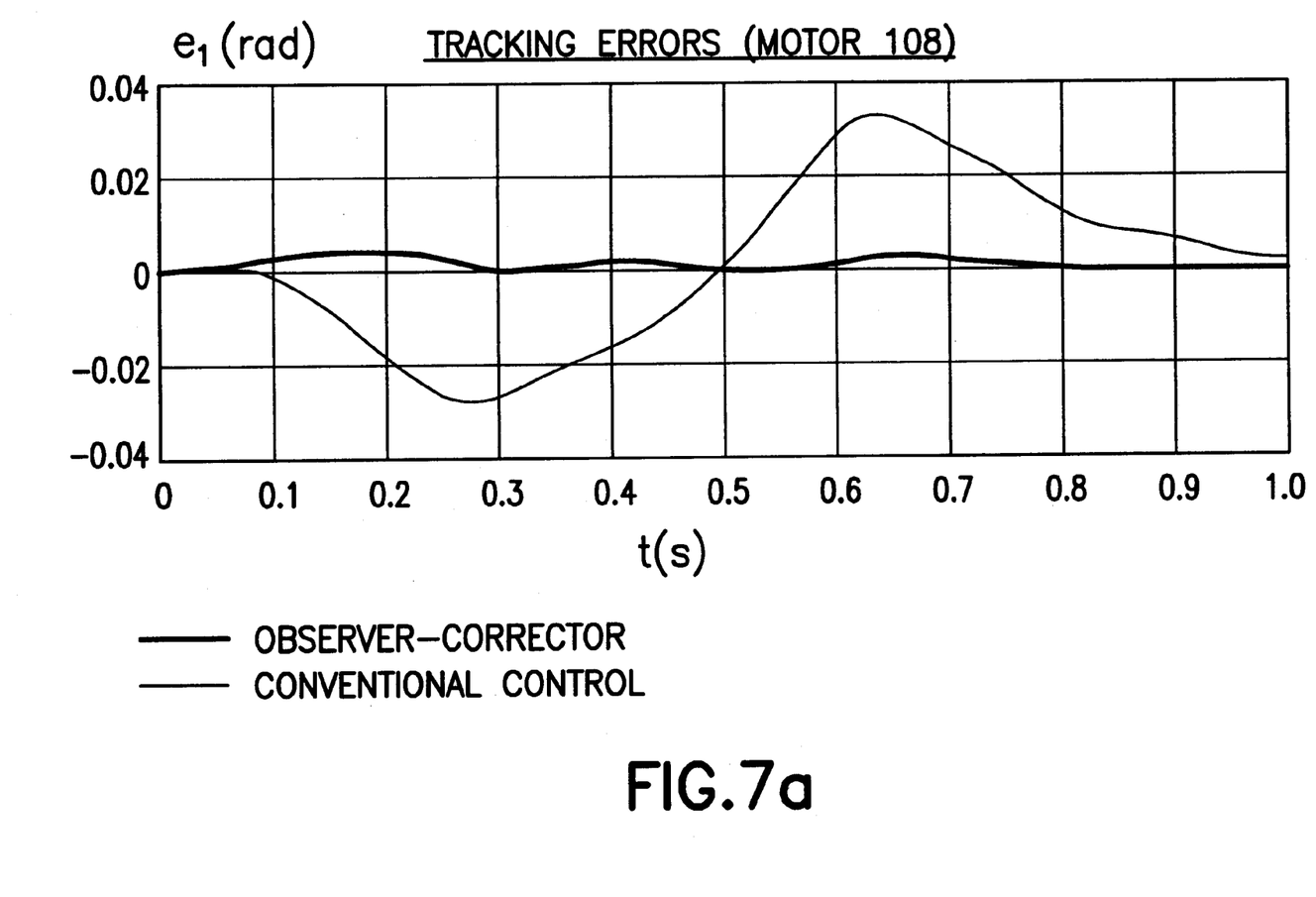
FIGS. 7a, and 7b are graphical representations of the tracking errors of the motors for the test implementation shown in FIG. 4. versus a conventional control.
Figure 7B:
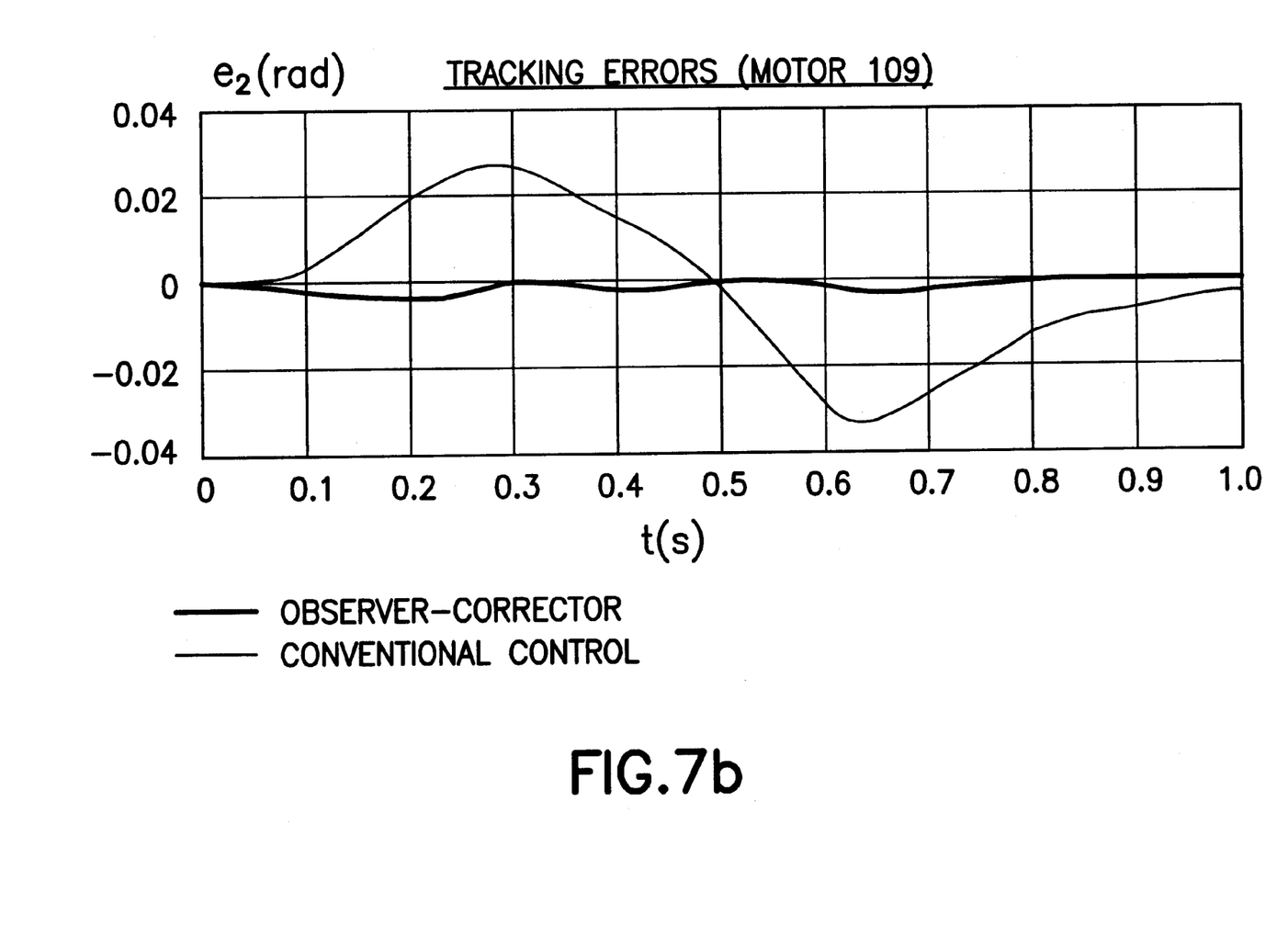

These control parameters remain the same as the parameters for the complete observer-corrector test embodiment of FIG. 4, except for the bandwidth of the PD compensators, which must be reduced to the level indicated in the table above in order to preserve stability and non-oscillatory behavior of the system 10. The tracking errors of the motors 108 and 109 in each implementation are compared in FIG. 7. As shown, the graphs indicate that the tracking performance of the conventional control mechanism (hairline) is improved by an order of magnitude by implementing the observer-corrector mechanism of the present invention (bold line).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for extracting a signal component that represents dominant dynamics in an output signal of a dynamic system comprising:
   a state observer adapted to track an actual signal component that represents dominant dynamics in the output signal of the dynamic system, and provide an estimation signal representing an estimated signal component that represents dominant dynamics in the output signal of the dynamic system; and
   a corrector filter adapted to compensate for a mismatch between the estimation signal and the actual signal component that represents dominant dynamics in the output signal;
   wherein a combination of the estimation signal with an output signal of the corrector filter can provide a synthesized signal including the signal component that represents dominant dynamics in the output signal.

2. The system of claim 1 further comprising a controller for the dynamic system, the synthesized signal forming a feedback signal used as an input to the controller, wherein a destabilizing effect of unmodeled higher order dynamics in the output signal of the dynamic system is reduced or substantially eliminated.

3. The system of claim 2 wherein the system is a control system for a machine.

4. The system of claim 2 wherein the state observer is adapted to receive a first input representing an output signal from the controller and a second input representing the dynamic system output signal.

5. The system of claim 4 wherein the second input representing the dynamic system output signal includes a measurement noise signal component.

6. The system of claim 2, wherein a design of the controller is based upon a model of the dynamic system that does not include the higher-order dynamics of the dynamic system.

7. The system of claim 1 wherein the dynamic system is a robotic manipulator.

8. The system of claim 1 wherein the synthesized signal does not include a signal component that represents higher order dynamics in the dynamic system output signal.

9. The system of claim 1 wherein the state observer is further adapted to track the actual signal component that represents dominant dynamics in the output signal of the dynamic system and not respond to a higher-frequency signal component of the output signal of the dynamic system, the higher-frequency signal component corresponding to a higher-order dynamics of the dynamic system and a measurement noise signal component of the dynamic system output signal.

10. The system of claim 1 wherein the state observer is a band-limited state observer.

11. The system of claim 1 wherein the corrector filter is further adapted to pass all lower-frequency signal components associated with the actual signal component that represents dominant dynamics together with an observation error signal component and attenuate all higher-frequency signal components associated with the higher order dynamics and a measurement noise signal component.

12. The system of claim 1 wherein the corrector filter is a linear low-pass filter.

13. A method of extracting a signal component from an output signal of a dynamic system comprising the steps of:
   estimating a signal component that represents dominant dynamics in the dynamic system output signal;
   compensating for a mismatch between the estimated signal component and an actual signal component that represents dominant dynamics in the dynamic system output signal;
   combining the estimated signal component with a signal representing the compensation for a mismatch between the estimated signal component and the actual signal component to provide a synthesized signal including the signal component that represents dominant dynamics in the output signal.

14. The method of claim 13 wherein the extracted signal component is a dominant signal component of the output signal.

15. The method of claim 13 further comprising the step of using the synthesized signal as a feedback input signal for a controller for the dynamic system, wherein a destabilizing effect of unmodeled higher order dynamic signal components in the dynamic system output signal are reduced or substantially eliminated.

16. The method of claim 15, wherein the step of estimating a signal component that represents dominant dynamics in the dynamic system output signal comprises the step of tracking the actual signal component that represents dominant dynamics in the dynamic system output signal while excluding a higher order signal component and a measurement noise signal component in the dynamic system output signal.

17. The method of claim 15 wherein the step of compensating for a mismatch between the estimated signal component and the actual signal component that represents dominant dynamics in the dynamic system output signal comprises the step of passing a lower-frequency signal component that represents dominant dynamics in the dynamic system output signal and an observation error while attenuating a higher-order frequency signal component and a measurement noise signal component of the dynamic system output signal.

18. A method of reducing effects of higher order dynamics in a controlled system comprising the steps of:
   tracking an actual signal component that represents dominant dynamics in an output signal of the controlled system;
   providing an estimation signal representing an estimated component that represents dominant dynamics in the output signal of the controlled system;
   compensating for a mismatch between the estimation signal and the actual signal component that represents dominant dynamics;
   combining the estimation signal with an output signal from the corrector filter to form a synthesized feedback signal, the synthesized feedback signal including a signal component that represents dominant dynamics in the output signal of the controlled system; and
   inputting the synthesized feedback signal to a controller for the controlled system, wherein a destabilizing effect of unmodeled higher order dynamic signal components in the dynamic system output signal is reduced or substantially eliminated.

19. The method of claim 18 wherein the controlled system is a robotic manipulator and the step of tracking an actual signal component that represents dominant dynamics in the output signal of the controlled system comprises tracking rigid body dynamics of the manipulator within a specified bandwidth.

20. The method of claim 19 wherein the step of combining the estimation signal with an output signal from the corrector filter to form a synthesized feedback signal comprises the step of combining an observed velocity signal of a motor with an output of the corrective filter to yield a clean synthetic signal which closely follows a raw velocity signal of the motor but does not contain the undesirable high-frequency components contained in the raw velocity signal.

* * * * *